Oct. 9, 1962 J. J. HOLLOWAY 3,057,191
APPARATUS FOR MEASURING THE FLEXIBILITY OF MATERIALS
Filed Sept. 30, 1960

INVENTOR.
JOSEPH J. HOLLOWAY
BY
John F. Luhea
ATTORNEY

United States Patent Office 3,057,191
Patented Oct. 9, 1962

3,057,191
APPARATUS FOR MEASURING THE FLEXIBILITY OF MATERIALS
Joseph J. Holloway, Shaker Heights, Ohio, assignor to Bailey Meter Company, a corporation of Delaware
Filed Sept. 30, 1960, Ser. No. 59,665
7 Claims. (Cl. 73—100)

This invention relates to measuring and testing apparatus and more particularly to a device for ascertaining the flexibility of a material.

The flexibility of relatively thick, stiff materials is readily measured by known methods and apparatus due to the ease of supporting such material for testing. In the case of extremely thin and flexible materials, however, problems have been encountered in performing an accurate flexibility test. Such highly flexible materials are extremely difficult to support and require a measuring device of high sensitivity and accuracy to make the tests. In the past the cost of suitable equipment has been prohibitive.

It is a principal object of my invention to accurately measure the flexibility of thin materials of high flexibility.

Another object of my invention is to accurately measure flexibility of highly flexible materials by means of a low cost pneumatic measuring device.

Another object of the invention is to provide an improved low cost device for measuring the flexibility of flexible material.

While the scope of the invention is to be ascertained from the claims appended hereto, for purposes of illustration I disclose the application of my invention to the measurement of the flexibility of highly flexible sheet material such as rubber or nylon. I disclose a pneumatic measuring device comprising a nozzle-baffle fluid pressure couple adapted to undergo a variation in couple pressure in response to variations in the couple spacing. The baffle is formed by one end of a pivotal beam having a predetermined weight distribution in respect to its pivot point. The material to be tested is doubled over to form a fold or roll on one edge thereof and is placed on a pedestal below the beam. The beam moves downward under the influence of gravity to engage the roll and thus assumes a position determined by the flexibility of the material and the resistance thereof to downward movement of the beam. A pneumatic amplifier is responsive to the couple pressure established by the position of the beam to establish a pneumatic output pressure which is utilized to restore the calibration spring of the nozzle and baffle and utilized to actuate an indicating device to manifest the flexibility of the material.

Other objects and advantages will become apparent from the following description taken in connection with the accompanying drawings wherein.

Figure 1:
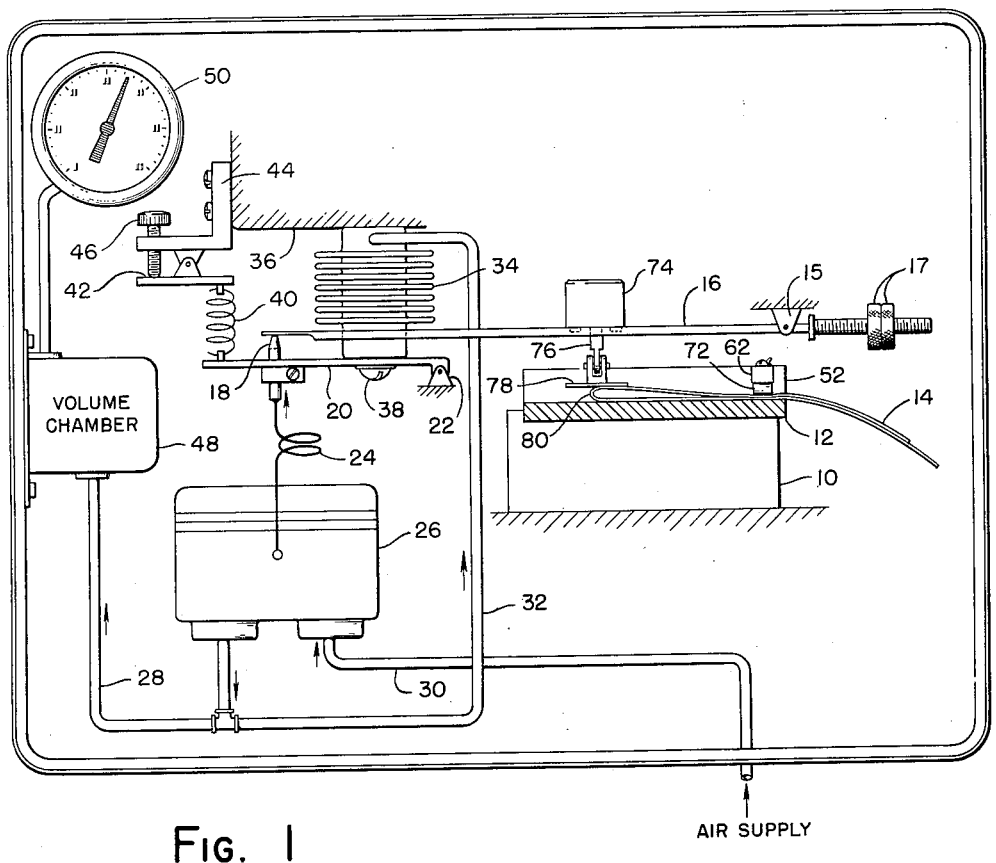
FIG. 1 is a schematic illustration of the measuring device embodying my invention.

Referring more particularly to FIG. 1 of the drawings, there is shown schematically a pedestal 10 on which is mounted a suitable fixture 12 for holding a sample of material 14 in the proper position to conduct a flexibility test. As will later be described in more detail the fixture 12 is operative to hold the material 14 in a folded or rolled over condition as shown more clearly in FIG. 2.

A beam 16 overlies the fixture 12 and is pivoted adjacent its right end on a suitable pivotal support 15. The right end portion of the beam 16 beyond the pivot support 15 is externally threaded to receive two knurled calibrating wheels 17 which are normally clamped together as shown in a locked condition. The left end of the beam 16 terminates adjacent a pneumatic nozzle 18 which is mounted on a lever 20 in turn pivotally mounted on a pivotal support 22. The left end of the beam 16 and nozzle 18 form a nozzle-baffle fluid pressure couple which develops a nozzle output pressure in conduit 24 proportional in magnitude to the spacing between the end of beam 16 and the tip of nozzle 18.

A pneumatic relay 26 having reset action is responsive to the nozzle pressure in conduit 24 to establish an amplified pneumatic output pressure signal in conduit 28. Air under pressure is supplied to the relay 26 from a suitable source by conduit 30. A suitable relay for this application is shown in copending application Serial No. 652,477 filed on April 12, 1957 by Bruce H. Baldridge, now Patent 2,974,674. Inasmuch as such pneumatic amplifying devices are well known to those skilled in the art, further description is deemed unnecessary.

As will later be described in more detail the beam 16 is arranged to be displaced relative to the nozzle 18 by the force of gravity acting thereon, the amount of displacement being proportional to the flexibility of the material 14. The output of amplifier 26 is utilized to position nozzle 18 and lever 20 to balance the motion of beam 16, the output pressure in conduit 28 being proportional to the rebalancing motion and thus the input motion and flexibility of material 14. More particularly, the output pressure in conduit 28 is supplied by conduit 32 to a flexible bellows 34 having one end thereof mounted on a fixed support 36 and the other movable end thereof operatively connected to lever 20 by screw 38. A predetermined calibration bias is applied to lever 20 in opposition to the expansive force of bellows 34 by a coil spring 40 which is mounted in tension between the left end of lever 20 and a tension adjusting lever 42. The lever 42 is pivotally mounted on support 36 by means of bracket 44 and engages a screw 46 which may be adjusted manually to vary the tension of spring 42 and the calibration of the pneumatic motion balance system.

In operation of the system thus far described counterclockwise pivotal movement of beam 16 will decrease the spacing between the end of the beam and nozzle 18 to vary the nozzle pressure in conduit 24. In response, amplifier 26 will cause the output pressure in conduit 28 to increase causing expansion of bellows 34 and counterclockwise pivotal movement of lever 20 against the bias of spring 40.

The output pressure in conduit 28 will continue to build up until the original spacing between beam 16 and nozzle 18 is restored at which point the system will come to rest, the final output pressure in conduit 28 being indicative of the flexibility of material 14. To provide a visual indication of the flexibility of material 14 the conduit 28 is connected through a volume chamber 48 to a suitable pressure responsive gage 50 which may be calibrated as desired in terms of flexibility standards.

Figure 2:
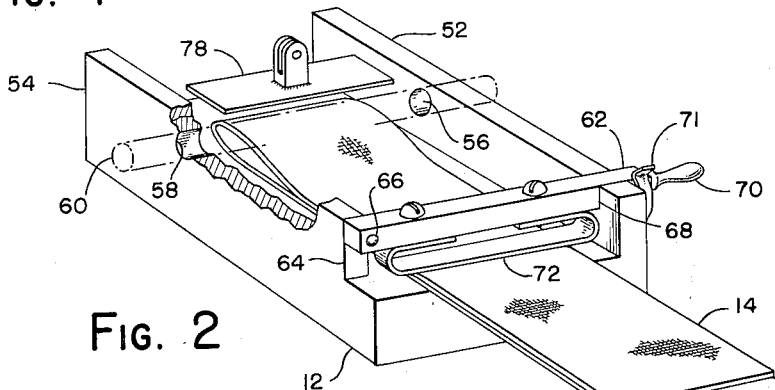
FIG. 2 is an enlarged perspective view of a portion of the measuring device.

Referring now in more detail to the fixture 12, this part as shown more clearly in FIG. 2 is in general channel shaped having oppositely disposed upwardly extending sidewalls 52 and 54 which are provided with oppositely disposed bores 56 and 58 respectively. To determine the position of the sample of material 14 a pin 60 of slightly smaller diameter than the bores 56 and 58 is adapted to be slidably received in the bores 56 and 58 in the position shown in FIG. 3 and indicated by the dotted lines of FIG. 2.

At the right end of the fixture 12 a clamping arm 62 of square cross-section is pivotally mounted at one end on the offset vertical edge 64 of the sidewall 54 by means of a pivot pin 66. The other end of the arm 62 is adapted to be received in a complemental square notch 68 formed in the right end of sidewall 52 and is provided with a suitable handle 70 to permit manual manipulation thereoff. A latching device 71 is provided to latch the arm 62 in engagement with the notch 68. To complete the clamping arm assembly a C shaped clamp of slight resiliency having a flat lower surface is fixed to the flat under surface of arm 62 to engage and lightly clamp the material 14 as shown most clearly in FIG. 2.

The structure of beam 16 cooperating with the fixture 12 includes a weight 74 carried on the upper side thereof and a lower depending support 76 on which is pivotally mounted a flat material contacting platen 78 defining a plane parallel to beam 16 and parallel to the base of fixture 12 at its operating point. The platen 78 and weight 74 are positioned in overlying relationship with respect to the pin 60, the platen 78 being provided to engage the material 14 when the pin 60 is removed.

Figure 3:
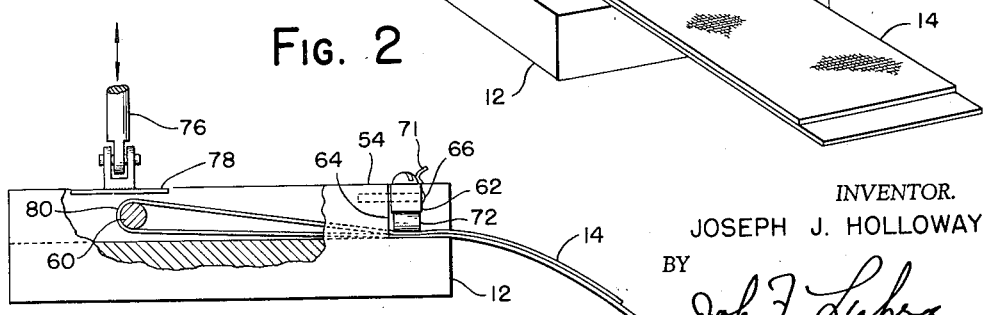
FIG. 3 is an enlarged cutaway side view of the parts shown in FIG. 2.

In operation of the flexibility tester, the arm 62 is raised by means of handle 70 and a sample 14 of the material to be tested cut to a suitable standardized width less than the width of platen 78 and convenient length is folded over to form the roll or loop 80 at one end thereof. The folded over sample is then placed in the fixture 12 as shown in FIG. 2. Pin 60 is inserted through holes 56 and 58 and through the roll 80 as indicated in FIG. 2 by the dotted lines. Next the sample 14 is shifted to the right until the roll 80 snugly engages pin 60 as shown in FIG. 3. The clamping arm 62 is then locked in the position shown in engagement with notch 68 and pin 60 is removed from the fixture 12.

During the positioning of the sample 14 in the above manner the beam 16 is held in its uppermost position wherein the platen 78 is out of engagement with the roll 80 as shown in FIG. 2. To accomplish a flexibility measurement the beam 16 is released to effect downward movement of the same under the influence of gravity on weight 74. As a result platen 78 will engage roll 80 and cause flexing of the same toward the flattened condition shown in FIG. 1. The final position of the beam 16 will depend on the resistance of roll 80 to deformation and thus the flexibility of the sample 14.

The downward displacement of beam 16 to its new position determined by the flexibility of sample 14 effects a decrease in spacing between the end of beam 16 and nozzle 18. As previously described this results in an increase in the output pressure of amplifier 26 and a manifestation of the flexibility of the material 14 by gage 50.

I have found that the rate of downward movement of the platen 78 during a flexibility test is also indicative of the flexibility of the material. To avoid the necessity of waiting for complete stabilization of the platen 78 before taking a reading and to take into account the rate factor I preferably read the gage 50 after a time interval of 10 seconds following release of the platen 78. This procedure also permits application of the device to the testing of material at different temperatures since the rate of downward movement of the platen 78 is dependent on the temperature of the material being tested.

It will be apparent that the fixture 12 provides an efficient low cost means for supporting a material sample for a flexibility test. The structure of fixture 12 and the fact that platen 78 is made larger than the width of sample 14 insures that during successive flexibility tests each material sample will be supported and engaged in the same exact manner eliminating any possibility of differences in readings due to differences in supporting and engaging different samples.

The pneumatic motion balance system utilized in combination with the fixture 12 additionally provides a highly sensitive low cost measuring device. The closed loop principle of operation of a pneumatic motion balance system eliminates errors in measurements as a result of changing characteristics of individual components of the system.

The magnitude of the output pressure in conduit 28 may be easily adjusted by varying the tension of spring 40 through adjustment of screw 46. In addition the weight distribution of beam 16 may be varied as desired to accommodate materials of different flexibility by adjusting the positions of wheels 17 which act as counterweights to the weight 74.

While only one embodiment of my invention has been herein shown and described, it will be apparent to those skilled in the art that many changes may be made in the construction and arrangement of parts without departing from the scope of the invention as defined in the appended claims.

It is claimed and desired to secure by Letters Patent of the United States:

1. A device for measuring the flexibility of flexible material comprising, a nozzle baffle fluid pressure couple adapted to produce a couple output pressure proportional in magnitude to the couple spacing, weighted means adapted to engage the material and assume a position determined by the flexibility of the material, an operative connection between said weighted means and said couple for varying the couple spacing to establish a couple output pressure proportional to the degree of flexibility of the material and means for measuring said output pressure to thereby manifest the degree of flexibility of the material.

2. A device for measuring the flexibility of flexible material, comprising, pivotal means having a predetermined off center weight distribution adapted to engage the material under the influence of gravity, the pivotal position of said means being dependent on the flexibility of the material, a nozzle-baffle fluid pressure couple adapted to produce an output pressure in response to variations in spacing of said nozzle and baffle, and an operative connection between said baffle and said pivotal means thereby effecting displacement of said baffle relative to said nozzle in response to pivotal displacement of said means to thereby produce an output pressure proportional to the flexibility of the material and means for measuring said output pressure as a manifestation of the flexibility of the material.

3. A device for measuring the flexibility of flexible material comprising, a pivotal beam having a predetermined off center weight distribution adapted to engage the material under the influence of gravity, the pivotal position of said beam being dependent on the degree of flexing of a material under the influence of the weight of said beam, and a nozzle forming a nozzle-baffle fluid pressure couple with one end of the beam having a couple output pressure proportional to the spacing between said beam and said nozzle and means responsive to the couple pressure to thereby manifest the degree of flexibility of the material.

4. A device for measuring the flexibility of flexible material comprising, a pivotal beam having a predetermined off center weight distribution adapted to engage the material under the influence of gravity, the pivotal position of said beam being dependent on the degree of flexing of the material under the influence of the weight of said beam, a pneumatic nozzle forming a nozzle-baffle fluid pressure couple with the end of said beam having a couple output pressure proportional to the spacing between said beam and nozzle, said fluid pressure couple being adapted to undergo a variation in output pressure in response to a variation in the position of said beam as the result of variation in the flexibility of the material measured, an expansible bellows for positioning said nozzle, a pneumatic amplifier responsive to said couple output pressure to establish an amplified output pressure signal representative of the flexibility of the material, and means for applying said amplified output signal to said bellows to position said nozzle to balance the displacement of said beam.

5. A device for measuring the flexibility of a flexible material as claimed in claim 4 wherein said off center weight distribution is established by a predetermined weight mounted on said beam.

6. A device for measuring the flexibility of a flexible material as claimed in claim 5 further including a pedestal with which the other end of said beam is cooperative and on which the material is positioned to be engaged by said other end of said beam.

7. A device for measuring the flexibility of a flexible material as claimed in claim 6 wherein the material is placed on the pedestal in a doubled over condition and said other end of said means engages the material adjacent the rolled edge thereof.

References Cited in the file of this patent

UNITED STATES PATENTS

| | | |
|---|---|---|
| 1,385,164 | Witham | July 19, 1921 |
| 2,577,805 | Piddock | Dec. 11, 1951 |
| 2,718,142 | Schwartz et al. | Sept. 20, 1955 |

FOREIGN PATENTS

| | | |
|---|---|---|
| 873,333 | France | Mar. 16, 1942 |
| 45,825 | France | Sept. 23, 1935 |

(Addition to No. 785,191)